Figure 1:
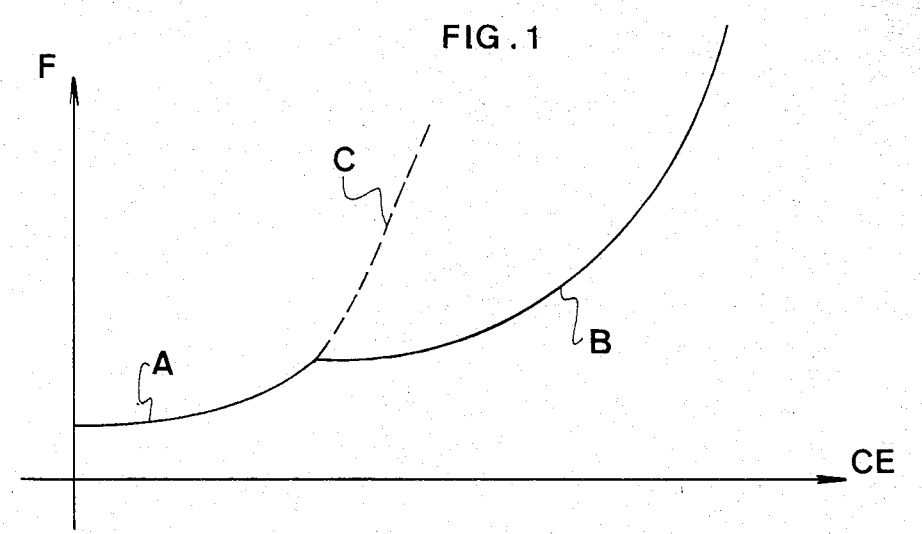

United States Patent [19]

Masclet et al.

[11] Patent Number: 4,506,869
[45] Date of Patent: Mar. 26, 1985

[54] DUAL CHAMBER SHOCK ABSORBERS FOR AIRCRAFTS AND THE LIKE

[75] Inventors: Jean Masclet, Paris; Jacques Veaux, Chatillon, both of France

[73] Assignee: Messier-Hispano-Bugatti, Montrouge, France

[21] Appl. No.: 542,094

[22] Filed: Oct. 17, 1983

Related U.S. Application Data

[63] Continuation of Ser. No. 282,641, Jul. 13, 1981, abandoned.

[30] Foreign Application Priority Data

Aug. 29, 1980 [FR] France .............................. 80 18732

[51] Int. Cl.³ .................... B60G 17/04; B64C 25/60; F16F 9/06; F16F 9/43
[52] U.S. Cl. .................................. 267/64.15; 188/269; 188/279; 188/299; 188/322.21; 244/104 FP; 267/64.16; 267/64.25; 267/64.28; 364/424
[58] Field of Search ............... 188/269, 279, 284, 285, 188/298, 299, 314, 317, 318, 320, 322.19, 322.21, 322.22; 267/64.15, 64.16, 64.19, 64.23, 64.25, 64.26, 64.28, 119, 151; 244/104 FP; 280/707, 708; 364/424, 426

[56] References Cited

U.S. PATENT DOCUMENTS

| 2,196,089 | 4/1940 | Wallace | 267/64.15 |
| 2,769,632 | 11/1956 | de Carbon | 267/64.28 |
| 3,019,029 | 1/1962 | Sampietro | 280/708 |
| 3,164,381 | 1/1965 | Tuczek | 267/64.15 |
| 3,201,112 | 8/1965 | Wossner | 267/64.15 |
| 3,250,526 | 5/1966 | Kress | 267/64.28 |
| 3,292,919 | 12/1966 | Lindley et al. | 267/64.28 |
| 3,540,683 | 11/1970 | Foster | 188/269 |
| 3,962,895 | 6/1976 | Rydell | 267/119 |
| 4,065,078 | 12/1977 | Jenkins et al. | 267/64.16 |
| 4,334,600 | 6/1982 | Palitto | 188/269 |
| 4,468,739 | 8/1984 | Woods et al. | 267/64.15 |

FOREIGN PATENT DOCUMENTS 2386427 11/1978 France .............................. 267/64.25

Primary Examiner—Douglas C. Butler
Assistant Examiner—Richard R. Diefendorf
Attorney, Agent, or Firm—McAulay, Fields, Fisher, Goldstein & Nissen

[57] ABSTRACT

The shock absorber is characterized by the fact that it comprises a rod (1) sliding in a cylinder (2) through a piston (3) to determine at least two variable-volume chambers (4,6), ports (40,41) for placing the two chambers in communication, one of the two chambers (4) comprising first elastic fluid (44) at a first given pressure, the other chamber (6) comprising second elastic fluid (10) at a second given pressure, controllable according to at least one parameter, corresponding to a force to be absorbed.

20 Claims, 3 Drawing Figures

DUAL CHAMBER SHOCK ABSORBERS FOR AIRCRAFTS AND THE LIKE

This application is a continuation of my early application Ser. No. 282,641, filed July 13, 1981, now abandoned.

The present invention relates to shock absorbers and more particularly to those which technicians customarily refer to as dual-chamber shock absorbers, the two chambers being filled generally with a compressible gas forming a spring.

Dual-chamber shock absorbers are well known and are generally made up of a rod sliding in a cylinder through a piston to delimit at least two chambers.

The piston includes means for fluid communication between these two chambers to constrict a fluid such as incompressible oil for example.

These two chambers contain incompressible fluid but also a compressible fluid such as a gas which functions as a spring.

In addition, the cylinder head has a third chamber in which a separating piston moves to divide this third chamber into two inversely proportional variable-volume compartments, one of the compartments being filled with a compressible fluid such as a gas to also provide a spring function, and the other compartment is placed in communication with the chamber defined in the cylinder so that fluid can fill it and if desired drive back the separating piston against a gas as of a certain pressure threshold.

However, in an expanded position, the separating piston abuts in a given position, the gas volume of the compartment being completely expanded but at a sufficiently high pressure.

In this starting hypothesis, if the shock absorber begins to be compressed, there first occurs the compression of the gas volume in one of the first two chambers up to a certain pressure threshold, and then as of this threshold, it is the second gas volume which is compressed. These functions are known and FIG. 1 represents a curve giving the variations in the plunging stroke of a shock absorber as a function of the force applied to it. Two parts appear on this curve, the first A, which represents the compression of the first so-called low-pressure compressible fluid and then the second B which represents the compression of the second so-called high-pressure compressible fluid, which makes it possible to obtain a damping force over a fairly long shock absorber stroke without having a stiffness as would be the case if the curve had the shape of the portion C of the curve A which is represented by a broken line. In fact, it appears that a small variation in the shock absorber stroke is obtained for a large force variation. These shock absorbers give good results but, in fact, it is found that when they are mounted on aerodynes, they can be poorly adapted to all circumstances. In fact, if, for example, an aerodyne takes off for a mission, it is generally loaded with fuel, equipment, men, etc.

It is thus necessary for the shock absorbers to be able to play their role for these heavy loads. By contrast, after having completed its mission, the aircraft returns after having consumed its fuel and parachuted the equipment and men. In this case, it will be considerably lightened. Hence, if initially the shock absorbers are perfectly adapted with the desired stiffness, when the aircraft returns they will be much too stiff and would be liable to produce, for example, spurious vibrations in the aircraft which are harmful and can result in damage and loss of comfort during taxiing on the runway. It is the object of the present invention to overcome these drawbacks and to provide a shock absorber allowing adaptability to various utilization conditions, notably owing to its stiffness.

More particularly, it is the object of the present invention to provide a shock absorber comprising a rod sliding in a cylinder through a piston to determine at least two variable-volume chambers, means for placing said two chambers in communication, one of the two chambers comprising first elastic means at a first given pressure, the other chamber comprising second elastic means at a second given pressure, characterized in that said second means are controllable according to at least one parameter, corresponding to a force to be absorbed.

Figure 2:
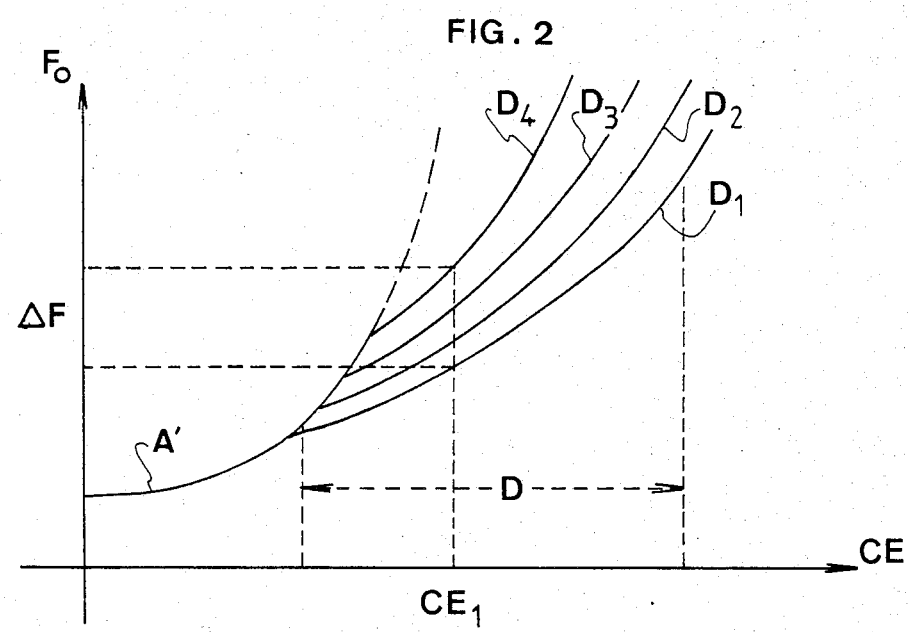
Figure 3:
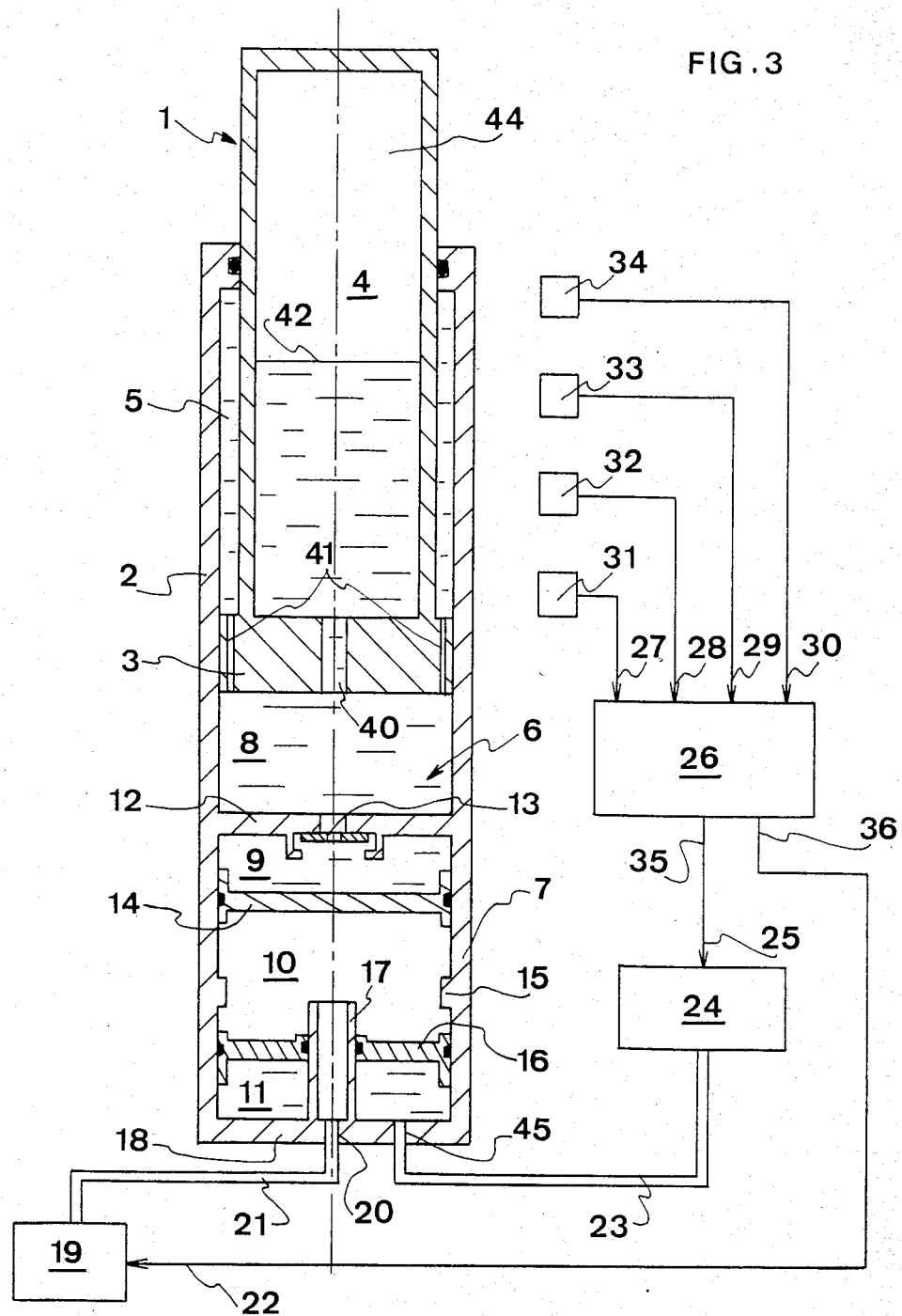

Other characteristics and advantages of the present invention will appear from the following description given by way of nonlimitative illustration with reference to the appended drawings in which:

FIG. 1 represents a curve giving the force as a function of the plunging stroke for known shock absorbers, already mentioned, FIG. 2 represents a curve giving the force as a function of the plunging stroke to explain the functioning and the advantages of a shock absorber according to the invention and, FIG. 3 represents, schematically, an embodiment of a shock absorber according to the invention.

In FIG. 2 is represented a set of curves which give variations in forces to be absorbed FO as a function of the plunging stroke CE for a so-called dual-chamber shock absorber, i.e. having two volumes of compressible fluid, respectively high and low pressure.

As pointed out above with reference to FIG. 1, this function includes essentially two portions A and B (FIG. 1).

The portion B gives a single force value for a single plunging value; consequently, different forces to be absorbed lead to large variations in the plunging stroke for the shock absorber.

The means used in the shock absorber according to the invention make it possible to obtain a function (FIG. 2) of the force to be absorbed according to the stroke in which it is possible on at least a part D to obtain for several force values $\Delta F$, at least in theory with a good approximation, a single value for the variation in the plunging stroke CE1, and this in a desired manner, automatically or not, according to different parameters. Thus, referring to FIG. 2 and depending on utilization conditions, it is possible to choose for example one of the possible variations D1, D2, D3, D4, . . . for the stiffness of the shock absorber. For large forces to be absorbed, a function such as D4 will be chosen preferably, referring to the example given previously, in the case of the departure of the aircraft. On the other hand, for smaller forces, a function $D_1$ or $D_2$ will be chosen; this is the case in which the aircraft comes back empty.

An embodiment of a shock absorber giving these results and advantages is represented schematically in FIG. 3.

This shock absorber comprises a rod 1 sliding inside a cylinder 2 through a piston 3. This piston 3 determines in the cylinder 2 at least two chambers, here three chambers 4, 5 and 6, the chamber 4 in the rod 1, the chamber 5 between the rod 1 and the cylinder 2, and the chamber 6 in the cylinder after the piston 3 in the end 7 of the cylinder 2.

The piston 3 comprises communication means 40 and 41 to link the chambers 6,4 and 5,6. This chamber 6 is divided into several parts:

- a first 8 between the piston and a transverse wall 12 including a constriction valve 13,
- a second 9 between the wall 12 and a separating piston 14 sliding in a sealed manner in the end 7 of the cylinder; the piston slides in the head between two stops, the first consisting of the wall 12 and the second 15 consisting of a projection in the internal wall of the cylinder 2,
- a third 10 between the separating piston 14 and a mobile head 16 sliding in a sealed manner in the end 7 of the cylinder and around a central annular nozzle 17 fixed on the fixed head 18 closing the end of the cylinder 2,
- a fourth 11 between the mobile head 16, the end 7 of the cylinder 2 and its fixed head 18, and the nozzle 17 to form a jack chamber capable of being supplied with fluid through the orifice 45 made in the fixed head 18.

It is specified that the mobile head also moves between two stops, the projecting part 15 and the fixed head 18. The space 10 is connecting advantageously to a source of compressible fluid 19 by the nozzle 17, an orifice 20 in the fixed head 18 and a line 21. This source can deliver a compressible fluid such as a gas in a given manner and may be controlled by a signal applied to its control input 22.

The space 11 is connected via a line 23 to a source of incompressible fluid 24 controllable at its input 25 by a command signal.

Finally, a computer 26 receives on its inputs 27, 28, 29 and 30 signals representative of different parameters, given for example by sensors 31, 32, 33 and 34 delivering respectively and by way of illustration signals representative of the force to be absorbed, set-value forces for choosing the desired function (FIG. 2), roll angles, aircraft speeds, etc.

The outputs 35 and 36 of the computer 26 are then connected to the control inputs 22 and 25 respectively of the source of compressible fluid 19 and incompressible fluid 24.

The chambers 4,5 and the spaces 6,9 contain an incompressible fluid such as oil up to a level, for example 42, in the chamber 4 and a compressible fluid 44 such as a gas forming a spring over the level 42. The shock absorber according to FIG. 3 and in conformity with FIG. 2 functions in the following manner.

It is first of all assumed that the gas volume contained in the space 10 is initially at a given pressure higher than that of the fluid 44 contained over the level 42.

The separating piston 14 is up against the wall 12, and the mobile head 16 is in a given position, for example up against the fixed head 18 of the cylinder 2. Consequently, the pressure in the space 10 has a certain value.

If the rod 1 is driven into the cylinder under the action of a force, the compressible fluid at 44 is compressed, oil then passes from the chamber 6 toward the chambers 4 and 5 until the value of the pressure of the fluid 44 is equal to that of the compressible fluid in the space 10. At this point, the piston 14 is driven back by fluid passing through the valve 13 into the space 9. The fluid at 10 is compressed as of a given value which will be defined as relatively low. These two functions are represented by the first part of the curve A' in FIG. 2 up to the point where the separating piston 14 plunges and, after this point, by the second part of the curve for example D1 since the pressure of the fluid in the space 10 has been chosen relatively low. The shock absorber thus obtained has a fairly low stiffness; this is the case for example of an aircraft carrying a relatively light load.

On the other hand, if the same shock absorber is desired but for a larger load, by means of the computer the source of fluid 24 is controlled to supply incompressible fluid to the space 11. The mobile head moves to take a position which will give the pressure of the fluid in the space 10 a given initial value, bearing in mind that the separating piston 14 is up against the wall 12. In this case, based upon these initial conditions as defined above, if the shock absorber is subjected to a force, it functions in its principle in the same manner as previously described, but it follows the function represented by the portions of curves A' and one of the portions $D_2$, $D_3$, $D_4$ depending on the position of the head 16 in the cylinder, of course with the same amount of compressible fluid in the space 10.

The example given above is simple but it is obviously possible, with a suitable program, to obtain simultaneous and/or continuous variations either in the position of the mobile head 16 between its two stops, or in the amount of compressible fluid, and any other possible combinations.

We claim:

1. A shock absorber comprising:
   a cylinder having an open end and a closed end;
   a hollow rod having a piston at one end slidable in said cylinder;
   a first chamber in said rod;
   a second chamber between said rod and said cylinder;
   a third chamber in said cylinder between said piston and said closed end of said cylinder containing an incompressible fluid;
   port means in said piston connecting said first and third chambers and said second and third chambers;
   said third chamber comprising:
   a first section defined by a transverse wall in said third chamber and by said piston, said transverse wall including pressure-relieving means;
   a second section formed by said transverse wall and a separating piston slidable between said transverse wall and a projection in said cylinder located at the proximity of said closed end thereof;
   a third section defined by said separating piston and a movable member slidable between said projection and said closed end of said cylinder; and
   a fourth section between said movable member and said closed end, said fourth section including a nozzle extending from said closed end through said movable member for supplying a compressible fluid through said nozzle to said third section, and an orifice in said closed end for supplying an incompressible fluid therethrough thereby forming a jack chamber;
   said first chamber containing first elastic means at a first given pressure;
   said third section containing second elastic means at a second given pressure; and
   said second elastic means being controlled by movement of said movable member according to at least one parameter corresponding to the performance of said shock absorber.

2. The shock absorber of claim 1, wherein said third section is connected to a controllable source of compressible fluid.

3. The shock absorber of claim 2, wherein said controllable source has a control input connected to the output of a computer, said computer having inputs receiving signals representative of different parameters including the force to be absorbed for displacing said movable member in accordance with said signals.

4. The shock absorber of claim 2, wherein a source of incompressible fluid is connected to said orifice and has a controlled input controlled by signals received by a computer receiving signals representative of different parameters including the force to be absorbed for supplying said incompressible fluid to said fourth section for displacing said movable member in accordance with said parameters.

5. The shock absorber of claim 2, wherein said first chamber contains a compressible and an incompressible fluid.

6. The shock absorber of claim 1, wherein said first chamber contains both a compressible and an incompressible fluid.

7. The shock absorber of claim 1, including a controllable source of compressible fluid connected to said nozzle and a control input connected to the output of a computer and to said controllable source, said computer having inputs receiving signals representative of different parameters including the force to be absorbed for displacing said movable member in accordance with said signals.

8. The shock absorber of claim 1, including a controllable source of incompressible fluid connected to said orifice and having an input controlled by signals received by a computer receiving signals representative of different parameters including the force to be absorbed for displacing said movable member in accordance with said parameters.

9. The shock absorber of claim 8, including a controllable source of compressible fluid connected to said nozzle and having an input controlled by signals received by said computer receiving signals representative of other different parameters including the force to be absorbed for displacing said movable member in accordance with said other different parameters.

10. A dual chamber shock absorber comprising:
a cylinder having an open end and a closed end;
a hollow rod having a piston at one end slidable in said cylinder and dividing said cylinder into a first chamber formed in said hollow rod, a second chamber between said rod and said cylinder and a third chamber in said cylinder between said piston and said closed end of said cylinder, said third chamber comprising a first section, a second section, a third section and a fourth section; and
first port means in said piston connecting said first and third chambers, and second port means in said piston connecting said second and third chambers;
said first section being defined by a transverse wall in said third chamber and by said piston, said transverse wall including pressure-relieving means;
said second section being formed by said transverse wall and a separating piston slidable between first and second stops, said first stop being said transverse wall and said second stop being a projection in said cylinder located at the proximity of said closed end thereof;
said third section being defined by said separating piston and a movable head slidable between said projection and said closed end of said cylinder;
said fourth section being between said movable head and said closed end and forming a jack chamber, said fourth section including an orifice extending through said closed end into said jack chamber for supplying an incompressible fluid through said orifice;
said first chamber containing first elastic means at a first given pressure;
said third section containing second elastic means at a second given pressure; and
said second elastic means being controlled by movement of said movable head according to at least one parameter corresponding to the performance of said shock absorber and characteristic of a force to be absorbed.

11. The shock absorber of claim 10, wherein said third section is connected to a controllable source of a compressible fluid.

12. The shock absorber of claim 11, wherein said first chamber contains a compressible and an incompressible fluid.

13. The shock absorber of claim 12, wherein said controllable source has a control input connected to the output of a computer, said computer having inputs receiving signals representative of different parameters including the force to be absorbed for displacing said movable head in accordance with said signals.

14. The shock absorber of claim 11, including a controllable source of incompressible fluid connected to said orifice and having an input controlled by signals received by a computer receiving signals representative of different parameters including the force to be absorbed for displacing said movable head in accordance with said parameters.

15. The shock absorber of claim 10, wherein said first chamber contains a compressible and an incompressible fluid.

16. The shock absorber of claim 15, including a controllable source of incompressible fluid connected to said orifice and having an input controlled by signals received by a computer receiving signals representative of different parameters including the force to be absorbed for displacing said movable head in accordance with said parameters.

17. The shock absorber of claim 16, including a nozzle connected with said closed end and extending into said third section.

18. The shock absorber of claim 17, including a controllable source of compressible fluid connected to said nozzle and having an input controlled by said computer for displacing said movable head representative of said different parameters.

19. The shock absorber of claim 10, including a controllable source of compressible fluid connected to said third section through a nozzle passing through said closed end and a control input connected to the output of a computer, said computer having inputs receiving signals representative of different parameters including the force to be absorbed for displacing said movable head in accordance with said signals.

20. The shock absorber of claim 19, including a source of incompressible fluid connected to said orifice and having an input controlled by signals received by said computer receiving signals representative of different parameters including the force to be absorbed for displacing said movable head in accordance with said parameters.

* * * * *